United States Patent [19]

Beltz et al.

[11] 3,792,447

[45] Feb. 12, 1974

[54] DISPLAY DEVICE CONTROL SYSTEM

[75] Inventors: John P. Beltz, Willingboro, N.J.; Timothy P. Ahlstrom, Larchmount, N.Y.

[73] Assignee: Ahlstrom, LaMarche & Co., Inc., New York, N.Y.

[22] Filed: Mar. 12, 1973

[21] Appl. No.: 340,198

[52] U.S. Cl. .......................................... 340/172.5

[51] Int. Cl..... G06k 15/18, G06f 5/04, G06f 11/08

[58] Field of Search .............................. 340/172.5

[56] References Cited

UNITED STATES PATENTS

| | | | |
|---|---|---|---|
| 3,693,166 | 9/1972 | Rawson et al. | 340/172.5 |
| 3,633,177 | 1/1972 | Caldwell | 340/172.5 |
| 3,631,455 | 12/1971 | Gregg | 340/172.5 |
| 3,512,131 | 5/1970 | Nelson et al. | 340/172.5 |
| 3,449,726 | 6/1969 | Kawamoto et al. | 340/172.5 |
| 3,421,151 | 1/1969 | Wong et al. | 340/172.5 |
| 3,335,408 | 8/1967 | Oliver | 340/172.5 |

*Primary Examiner*—Paul J. Henon
*Assistant Examiner*—Jan E. Rhoads
*Attorney, Agent, or Firm*—Hubbell, Cohen & Stiefel; Lawrence G. Kurland

[57] ABSTRACT

An operator display device control system for use with a computer data input device such as a tape drive or a disc driver intercepts an IBM OS hard copy printing instruction or message control signal to a printer or cathode ray tube operator console and provides a simplified visual display of the instruction with the appropriate tape or disc volume serial no. at the appropriate tape or disc drive for a plurality of such drives while still enabling the hard copy printing instruction to pass to the printer or cathode ray tube console for a substantially simultaneous printing thereof at the centrally located console. The display device control system includes a plurality of these display devices which enables the individual instructions to be displayed at the tape or disc drives to which the operator control instructions pertain as well as enabling the hard copy printing of the instruction at a central console.

19 Claims, 3 Drawing Figures

DISPLAY DEVICE CONTROL SYSTEM

BACKGROUND OF THE INVENTION

1. Field of the Invention

The present invention relates to display devices for use in a computer system and more particularly to display devices for use with a data input or output device of such a system and a control system therefor.

2. Description of the Prior Art

Display devices which provide a visual display of indicia in response to control information are well known. By way of example, U.S. Pat. No. 3,171,114 discloses an automatic assembly line programmer for visual display of instructions to be carried out wherein a bank of lamps are serially operated after each proper step is carried out to indicate the next step to be carried out. Another prior art signaling system is of the type disclosed in U.S. Pat. No. 3,534,357 wherein a customer activates a switch at a station to provide an address on an illuminated panel, a light signal being indicated at the compartment when a switch is closed. Another prior art type of display system of control information is disclosed in U.S. Pat. No. 3,206,72 which discloses a traffic control system which utilizes stepping switches and a plurality of light panels at each station for selective display of one of a plurality of instructions by illumination of a selective lamp. However, these individual displays are not responsive to signals from a central computer. Another typical prior art display device for control information is disclosed in U.S. Pat. No. 3,163,926 which discloses a display device wherein a plurality of lamps are activated to indicate a proper path to be followed for wrapping a cable harness.

The use of Nixie tubes or light emitting diodes in conjunction with a shift register to visually display the information scored therein is also well known in the prior art as shown by way of example in U.S. Pat. No. 3,449,726.

Use of Operating Systems for the control of a computer system having a plurality of input and/or output devices and, in several instances a plurality of computers, is well known and and has long been utilized by the International Business Machines Corp. under the designation OS. Such an OS Operating System is essentially a programming or software system for regulating the flow of data information into and out of the main frame computer, such as an IBM 370 or IBM 360 series computer by controlling input output scheduling, task scheduling, error detection and recovery data management, debugging, multiprogramming, on-line diagnostics, and other services. This operating system or OS utilized by IBM has many variations such as MST, MVP and HASP, and utilizes a plurality of message Descriptor codes, such as 29 different codes, which uniquely identify the type of message being provided from the main frame computer to the operator console associated therewith, such as IBM Model 3215 printing console for use with an IBM 370 Model 155 computer. This prior art operating system or OS in each of its variations, provides a series of operator instructions or control signals identified by these Descriptor codes which are transmitted to the printing or cathode ray tube console to provide a hard copy printout of the instruction for the operator. These instructions or control signals include instructions or control signals of the type relating to the data input or output devices associated with the main frame computer and which are being controlled by the OS system. Normally, a plurality of data input devices, such as disc drives and/or tape drives are utilized with the main frame computer. In the case of tape drives, the tapes utilized thereon are usually changed many times during the carrying out of a specific application program. The instructions for the operator as to which tape is to be placed on which tape drive and what to do with the tape contained on a particular tape drive is normally governed by the OS system which provides these instructions in a hard copy printout at the centrally located console. This requires the operator to read the hard copy printout at the centrally located console, then select the appropriate tape and go to the particular tape drive to which the particular instruction applies, recheck the printed instruction, if he has marked it down, and then do what is supposed to be done with the tape at that drive. This allows a great margin for operator error and, as a practical matter, many such errors do occur in present day computer installations. To date, there is no satisfactory display device and control system therefor for use at each of the data input devices or tape drives under the control of an OS system to provide a dynamic simplified visual display of the instruction pertaining to that particular drive at each of the drives without modifying the existing OS system. Some prior art attempts have been made to provide such information, although these systems are software systems which modify the OS system in the main frame computer and increase the probability that errors may be introduced into the OS system due to such modification.

These disadvantages of the prior art are overcome by the present invention.

SUMMARY OF THE INVENTION

The present invention is a data display control system for intercepting a hard copy printing instruction, and reformatting this instruction in order to obtain the necessary control information for providing a visual display therefrom by the activation of designated indicia as well as a digital display of the appropriate volume serial no. of the data storage media, such as tapes, at a plurality of locations, such as the tape drives, each location having distinct instructions displayed thereat. The display control system is preferably for use with an IBM OS operating system, in all variations thereof, wherein the operator control instruction signal to the printer or cathode ray tube console provided by OS is intercepted and reformatted to provide the simplified visual display at the appropriate display device which is located at the particular tape drive to which the operator control instruction pertains. The display device is preferably utilized with a tape drive and provides a visual indication, such as by illuminated lamps and corresponding indicia, of the instruction such as mount, dismount, scratch, or intervention required (in terms of IBM notation) as well as, in conjunction with a dismount message, a visual display of the indicia K, R, or D, (again in terms of IBM notation). A digital display of the volume serial no. of the particular tape to which the instruction applies at that particular drive is also provided. All of this display control information is obtained from the OS generated hard copy printing instruction control signal which is reformatted to provide display control signals for operating the appropriate display in response to the OS print messages. These OS print message control signals are also still provided to the operator console which prints the messages. The OS printing message control signal is preferably intercepted by virtue of a T-type connector associated with the IBM console device controller, such as the integrated adapter housed within an IBM 370 Series, Model 155 computer, and particularly the Word 1 plus Word 2 register thereof which translates the EBCDIC coded data signal provided from the main frame computer, such as an IBM 370 Model 155, to a matrix printing code of eight binary bytes, such as the type utilized for an IBM 3215 printing console when that is the operator console utilized with the main frame computer. A condition responsive logic network comprising a plurality of gates and shift registers, or a minicomputer, such as an Albha 8 minicomputer manufactured by Computer Automation Inc. of Irvine, California, receives this intercepted message, which is first passed through an optical isolator which protects the main frame computer, and translates this message signal back into EBCDIC. The logic network recognizes the discrete IBM OS message Descriptor codes which uniquely identify the type of message and preferably classifies these codes into at least one of three primary classes, such as mount, dismount, or intervention required, as well as to determine if it is a scratch code, this classification signal being bufferred or stored, one message per tape drive preferably being buffered. The logic network than proceeds to edit the message to determine if the appropriate instruction designator signal follows the Descriptor code signal to complete the instruction. This recognition is accomplished by the presence of particular bits in a shift register network, certain groups of bits in the signal identifying certain fields. The logic network also checks or recognizes the tape address provided to the shift register network and the volume serial no., which is the physical tape identification number. Each part of the display control message signal is buffered, the balance of the OS print message signal being discarded. The condition responsive logic network preferably converts this buffered information into a parallel bit display device binary control message signal preferably comprising a 16 bit display lamp indicator control message signal derived from the Descriptor field and the instruction field, a three byte address signal which corresponds to the physical address of the tape drive derived from the tape address portion of the OS printing message control signal, and a 36 vit volume serial no identification digital display control signal, with six bits preferably being provided for each position of, preferably a six digit display provided such as by light emitting diodes. This parallel bit message control signal is converted into, a serial bit message control signal by a conventional parallel-to-serial converter.

The serial bit message display control signal is provided to the appropriate tape drive display devices at the appropriate tape addresses. Each display device preferably includes a shift register for local message storage and a serial-to-parallel converter located between the input to the display device and this shift register. In addition, the output of the local shift register is preferably provided to a decode matrix and a gating network for control of the light emitting diode digital display of the volume serial no. and to another decode matrix and a gating network for control of the indicator lamps relating to the data control instruction to be displayed in response to the display control signal. The display device preferably converts the serial bit message control signal to a parallel bit signal, locally stores the entire message control signal in the shift register, and decodes this message display control signal and drives the alpha-numeric light emitting diode digital display and the indicator lamps in response thereto. In addition, each display device sends a status message signal back to the condition responsive logic network which status signal contains the drive address, an indication of whether or not the message was received, and an indication of whether or not additional action is required, such as retransmission or cancellation or the display control signal. This additional action which can be requested at each display device comprises a reset function and a retransmit function which are preferably activated by push-button switches. If the reset function is activated, and this information signal is provided to the condition responsive logic network in the status message signal transmitted thereto, the logic network providing the display control signal will, in response thereto, provide a clear signal to the local shift register of the particular tape drive in order to zero or initialize this register and extinguish the display. If the retransmit function is activated, then the buffered display control signal stored in the condition responsive logic network is retrieved and retransmitted to the particular display device.

DETAILED DESCRIPTION OF THE PREFERRED EMBODIMENT

Figure 1:
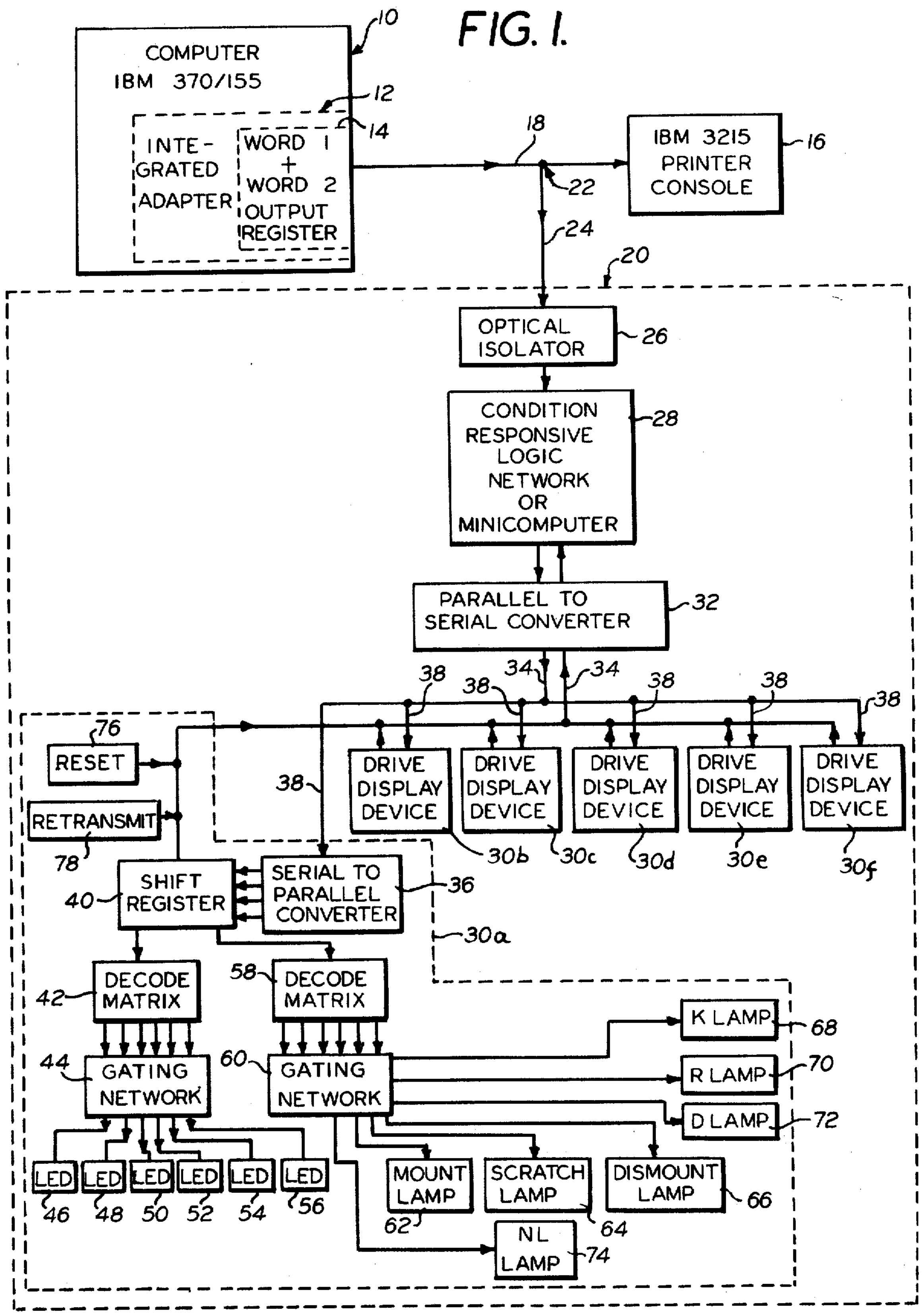
FIG. 1 is a block diagram of the preferred display device control system of the present invention in a one computer installation

Referring now to the drawings in detail and particularly to FIG. 1 thereof, a block diagram of a typical computer system operating under IBM OS and which employs the data input device operator display control system of the present invention is shown. Preferably, the computer system includes a conventional general purpose computer 10, such as an IBM 370 Model 155 or 145 operating under OS or an IBM 360 series conventional general purpose digital computer operating under OS. For purposes of explanation, it should be assumed that the general purpose digital computer 10 is an IBM 370 Model 155 operating under OS which main frame computer 10 conventionally preferably includes an IBM integrated adapter 12, which is a conventional device controller which provides an interface between the main frame computer 10 and the operator console associated therewith. This conventional integrated adapter 12 also preferably includes a conventional output register, termed by IBM as a "word 1 plus word 2" output register 14, which is a register which translates the OS message signals which are normally coded in Extended Binary Coded Decimal Interchange Code (EBCPIC), which is an eight bit binary-coded-decimal code, into a matrix printing code for the operator console. The output of the word 1 plus word 2 output register 14 is preferably hard wired to an operator console 16, such as a printer console or a CRT which prints the operating system or OS messages, via a hard wire path 18. By way of example, an IBM 3215 printer console 16 is shown as hard wired via path 18 to the main frame computer 10, although, if desired, any other display console, such as an IBM 3270 cathode ray tube (CRT) console or an IBM 3210 printing console for use with an IBM 370 series computer, or an IBM 1052 printing console or 2260 cathode ray tube console for use with an IBM 360 series computer. The integrated adapter 12 is normally located in the central processing unit or CPU of the main frame computer 10. By way of example, when the operator console 16 is an IBM 3215 printer console, the matrix printing code therefor comprises eight binary bits and the word 1 plus word 2 output register 14 translates the OS generated message printing control signal, which is coded in EBCDIC, into a printing control signal coded in the eight binary bit matrix printing code.

As is known to one of skill in the art, an operating system or OS, generally comprises a group of interrelated programs which are utilized in a computer system to increase the utility of the hardware and may vary in size and complexity from a small batch processing monitor to a large group of control and service programs controlling a multicomputer complex. Such an operating system or OS contains coordinated programs to control input-output scheduling, task scheduling, error detection and recovery, data management, debugging, multiprogramming, on-line diagnostics, and other services. Normally, the task management portion of the Operating System provides the message control signals which enable management of the control facilities, such as the central processing unit, storage, and input/output channels and devices, according to a task priority scheme, including the OS message printing control signals in which the computer operator is informed which data input devices, such as tapes are to be mounted at a specific time on a specific drive therefor. For purposes of clarity, the various tape drives, which are preferably conventional IBM tape drives, are omitted from the drawings. The term data input device are used hereinafter throughout the specification and claims includes both the drive for inputting the data to the computer 10 and the data storage media, such as the tape, mountable on the drive to input the information stored on the media. In addition, whenever the term data input device is utilized throughout it is meant to also include data output device, such as a printer.

Preferably, an operator data input device display control system, generally referred to by the reference numeral 20, is hard wired via a T-type connector 22 to the OS generated message signal transmission path 18 between the word 1 plus word 2 output register 14 of the computer 10 and the operator console 16 so as to intercept the OS generated printing message control signal transmitted to the console 16 while still enabling these printing message control signals to be transmitted to the console 16 to provide a hard-copy printout of the printing instructions in response to the OS generated printing message control signal. This T-connector 22 is preferably a conventional edge connector which is connected to the output pins providing the word 1 plus word 2 register 14 output and the timing signals associated with this register 14 output, which signals have been translated from EBCDIC into the eight binary bit matrix printing code. This intercepted printing message control signal is provided via a hard-wired path 24 to a conventional optical isolator 26 such as the type manufactured by Texas Instruments under the designation and which isolates the display control system 20 from the main frame computer 10 and the operator console 16.

The output of the optical isolator 26, which is the intercepted OS printing message control signal preferably coded in the eight binary bit matrix printing code for the IBM 3215 printer console 16, is provided to a conventional condition responsive logic network 28 comprising a plurality of shift registers and gates which are wired to be responsive to this message printing input control signal, in a manner to be described in greater detail hereinafter, to extract the portions of the printing message control signal which are required to operate the various visual display devices 30 located, respectively, at the data input devices or tape drives (not shown). If desired, in place of the condition responsive logic network 28, a conventional minicomputer, such as an ALPHA 8 minicomputer manufactured by Computer Automation Inc. of Irvine, California, could be utilized: thus the hard-wired condition responsive logic network 28 could, if desired, be replaced by a network utilizing micro programming or by a network utilizing random excess memory programming, such as the aforementioned ALPHA 8 minicomputer programmed in Symbolic Assembly Language. The shift registers (not shown) of the condition responsive of the condition responsive logic network 28 are conventional registers which load the various bits comprising the printing message control signal into designated positions, with one or more of these positions being grouped into fields, each field comprising a segment of the printing message control signal having less than the total plurality of bits comprising the printing message control signal. The logic network 28, if desired, can utilize a large bit capacity shift register capable of receiving the entire printing message control signal length or a plurality of shift registers, each capable of receiving a portion of the message control signal length, such as one field. Initially, the condition responsive logic network 28 preferably includes a register which conventionally translates the eight binary byte intercepted matrix printing coded signal back into EBCDIC. Prior to operating on the message control signal, although, if desired, the control signal could be operated on as a parallel or serial bit signal with appropriate circuitry and logic.

In order to further understand the operation of the condition responsive logic network 28, a typical OS printing message for a tape drive will be utilized, by way of example. Such an interceptable typical IBM OS printing message, could be a mount message having the following configuration or appearance when printed by the printer console 16: *1EF233A M 283,001753, SL,CPFAR005,GO,CWCOM.FAR02001 The various portions of this OS printing message are as follows: The term IEF233A is the IBM OS message Descriptor code which uniquely identifies the type of message signal being transmitted, these printing message signal types generally being classifiable into given classes of codes, three of these classes being mount, dismount, and intervention required, which is an IBM term meaning something is wrong with the system and the operator is required to act to correct the problem. Preferably, the condition responsive logic network 28 is responsive to 29 different such Descriptor codes. The next term, represented by the symbol M, is what may be termed the instruction field, M representing a mount instruction, D representing a dismount instruction, K representing a Keep-dismount instruction, R representing a retain-dismount instruction, and a symbol INT REQ representing an intervention required instruction. The symbol 283 represents the unit or tape address and preferably physically corresponds to the identifying number utilized on the particular tape drive. The next term, represented by the symbol 001753 in the example given, represents the volume serial number (no.) of the particular tape to which the instruction or printing message pertains. The next term or field, represented by the symbol S1 in the example shown, represents the label code for the tape, SL meaning standard label, NL meaning no label, etc, these terms being conventional in the art for an OS printing message. As will be described in greater detail hereinafter. the balance of the OS generated printing message is preferably discarded and is not utilized by the display control system 20 or the condition responsive logic network 28. However, for purposes of completeness, the balance of the fields are termed job name, represented by the symbol CPFAR005 in the example, step name represented by the symbol GO in the example, and data set name represented by the symbol CWCOM.FAR02001 in the example. The operator action to be taken in response to the typical OS printing message provided by way of example is to mount standard label tape Ser. No. 001,753 on tape drive 283, and this instruction is printed at the printer console 16 in the coded format given above with the various symbols.

The condition responsive logic network 28 is preferably arranged to recognize 29 different IBM Descriptor codes associated with the various OS generated printing messages. This portion of the printing message control signal is loaded into a shift register, and the bit configuration thereof is provided to a gating network which has conventionally been arranged to be responsive to the desired Descriptor codes. This conventional gating network is further arranged to be responsive to bit configurations of the Descriptor code which may be classified into typical arrangements representive of a mount code signal, a dismount code signal, an intervention required code signal, and a scratch code signal, the gating network preferably being responsive to seven classes of Descriptor code signals. The gating network, which has classified the code signal into one of these classes, then provides this signal to a shift register to buffer or store it for subsequent recall, preferably only one such classified Descriptor code signal being stored per tape drive. The condition responsive logic network 28 also includes a shift register portion or separate register associated with what is termed the instruction field, and the binary bit configuration representative of the contents of this field are provided from the shift register to the gating network which is responsive to the bit configuration or signal representative of the aforementioned letter symbols. This signal is also passed from the gating network to the previously mentioned shift register for storage along with the signal representative Descriptor code. The condition responsive logic network 28 also includes a shift register portion or separate register and a gating network responsive to the bit configuration representing the tape address and a signal representative of this associated field is also preferably stored in the storage shift register. In addition, the volumn serial no. bit configuration received by the condition responsive logic network 28 is provided to a shift register portion or separate register gating network responsive thereto and therefrom is buffered and stored in the previously mentioned storage shift register. The condition responsive logic network 28 also preferably contains a gating network responsive solely to the presence of the symbol NL in the label code field for providing a signal in response to the presence of this code or bit configuration representative thereof. This information is also buffered and stored in the storage shift register. Thus, the information or signal portions stored in the storage shift register comprises a plural bit message display control signal, which has been formatted from the original OS generated input message signal, into a display control signal which preferably comprises a 16 bit indicator message control signal portion, a three byte address signal portion and a 36 bit volume serial no. identifier message control signal portion with six bits being provided per display position for a preferably six position display.

The previously mentioned storage or buffering and gating of the condition responsive logic network 28 is preferably accomplished with the input signal encoded in EBCDIC and the output shift register of the condition responsive logic network preferably translates the reformatted display control signal into a binary parallel bit message control system. This parallel bit message signal is preferably provided to a conventional parallel-to-serial bit converter 32 which converts the message into a binary serial bit message control signal although, if desired, such conversion could occur in the logic network 28. The binary serial bit message control signal from converter 32 is preferably provided through a common output bus 34 to the drive display devices 30*a*, 30*b*, 30*c*, 30*d*, 30*e*, 30*f*, six such display devices being shown by way of example, one such display device 30 preferably being associated with one tape drive (not shown).

Preferably, all of the drive display devices 30 are substantially identical in operation and construction, and, accordingly, only one such typical drive display device 30*a* will be described in greater detail hereinafter, the balance of the drive display devices 30*b* through 30f inclusive, preferably being identical therewith. The drive display device 30*a*, which preferably provides a visual display of the operator control instruction including a digital display of the volume serial no. of the appropriate tape at the proper tape drive or tape address, preferably includes a conventional serial-to-parallel converter 36 connected to the common output bus 34 for receiving the display control signal provided from the condition responsive logic network 28 through output converter 32. The serial-to-parallel converter 36 is preferably connected in parallel via a path 38 to the common output bus 34 with the converters 36 of the other drive display devices 30. The conventional converter 36, preferably converts the binary serial bit display control signal message into a parallel bit message which is provided to a conventional shift register 40 for local message storage of the entire display control signal message in the display device 30*a*. This shift register 40, after receiving the display control message signal sends a status message signal back via the common bus 34 to the condition responsive logic network 28.

Figure 3:
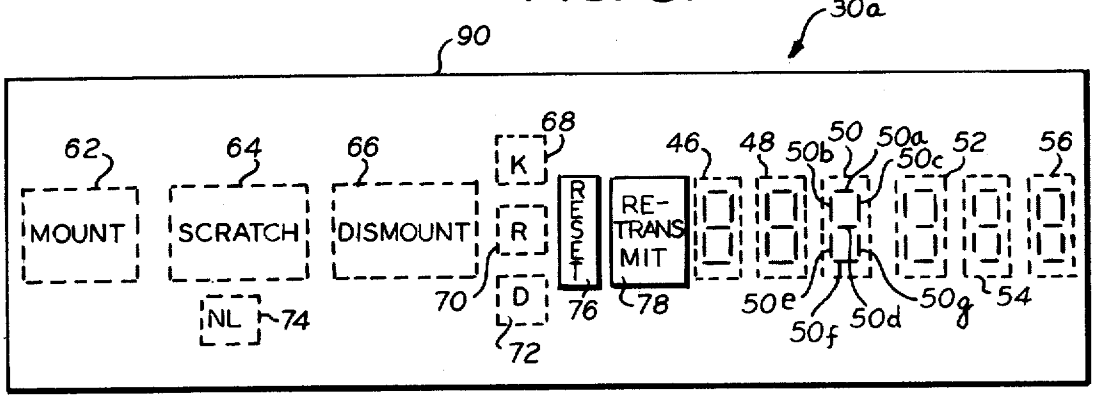
FIG. 3 is a diagrammatic illustration of the display panel format of the preferred display device of the present invention.

This status signal contains the three byte tape drive address, a signal indicative of whether or not the transmitted display control message signal was received, and a signal indicative on the closure or activation of a switch, such as a push-button switch, indicating a reset command or a retransmitt command signal, to be described in greater detail hereinafter. As is understood by one of skill in the art, the shift register 40 is only responsive to display control message signals provided to the appropriate tape drive address of that shift register 40. As was previously mentioned, the balance of the display control message signal consists of two portions which are termed the indicator control message signal portion and the volume serial number identifier message signal portion. The indicator control message signal portion provides control signals which operate one or more of a plurality of indicator lamps or lights on the display panel g0(FIG. 3) of the display device 30*a*, a specific operator control printed message being illuminated when a particular associated lamp is turned on in response to the indicator control signal. The volume serial number identifier message signal portion, which preferably comprises six bits per position for six position display, provides control signals to a digital display. The digital display is preferably one provided by conventional light emitting diodes (LED) which are conventionally controlled by six bit ASCII coded display signals, a light emitting diode display being a typical seven segment digital display (FIG. 3). The display control signal portion relating to the digital display, is preferably provided from the shift register 40 to a conventional decode matrix 42 and gating network 44 which decodes this volume serial number identifier message control signal into the appropriate control signal for the various light emitting diode seven segment displays 46, 48, 50, 52, 54 and 56, the digital display comprising six positions or numbers by way of example. The operation of the decode matrix 42 and gating network 44 to control the light emitting diode displays 46 through 56, inclusive, is conventional and will not be described in greater detail hereinafter.

The indicator control message control signal portion contained in shift register 40, which signal preferably comprises 16 bits, is also preferably provided to another conventional decode matrix 58 and associated gating network 60 which is responsive to the sixteen bit indicator control message control signal for turning the various associated indicator lamps on and off depending on the gated signals. Preferably, the various lamps or indicator lights provided are associated with the following printed illuminable messages (FIG. 3); mount, scratch, dismount, K,R,D, and NL, which are indicated by reference numerals 62, 64, 66, 68, 70, 72 and 74, respectively (FIGS. 1 and 3), each of these lamps being conventionally controlled by appropriate logic gating. As will be explained hereinafter, the gating network 60 is preferably arranged to be responsive to the indicator control message control signal to illuminate the dismount lamp 66 in conjunction with the appropriate dismount instruction lamp 68, 70, 72. In addition, the gating network 60 is preferably trained to be responsive to the indicator control message control signal to illuminate the scratch lamp 64 in conjunction with the signal lamp 74 on the display control signal message signal which contains the label code signal equivalent to the symbol NL for no label when this signal is present in display control signal. However, the gating network will illuminate only the scratch lamp 64 when any other label code is signal is detected with the detection of a scratch code signal in the illustration field position of the shift register 40. In addition, the gating network 60 is also preferably arranged to be responsive to the indicator control signal to illuminate the mount lamp 62 in response to the presence of a mount signal in the instruction field position of the shift register 40.

The tape display device preferably also includes a reset switch 76 and a retransmitt switch 78 which are preferably push-button switches which are operatively wired to the condition responsive logic network 28 via the common bus 34. Closure or activation of the reset switch 76 provides a signal to the condition responsive logic network 28 which, in response thereto, transmits a clear signal via common bus 34 to the shift register 40 to zero or initialize register 40 and thereby extinguish whichever lamps 62 through 74, inclusive, are illuminated as well as to extinguish the digital display 46 through 56, inclusive. If desired, the logic network 28 can be conventionally arranged to transmit a clear signal extinguishing the digital display only after the reset switch 76 is activated twice in succession so as to permit cancellation of the indicator display while still providing the digital display. The closure or activation of the retransmit switch 78 provides a signal to the condition responsive logic network 28 via the common bus 34 which network 28, in response thereto, is arranged to retrieve the buffered message from the storage register, in which the message remains permanently stored until replaced by a subsequent message, and retransmit this buffered message to the display device shift register 40 via converters 32 and 36 in the manner previously mentioned with reference to the original transmission of the display control message signal.

Figure 2:
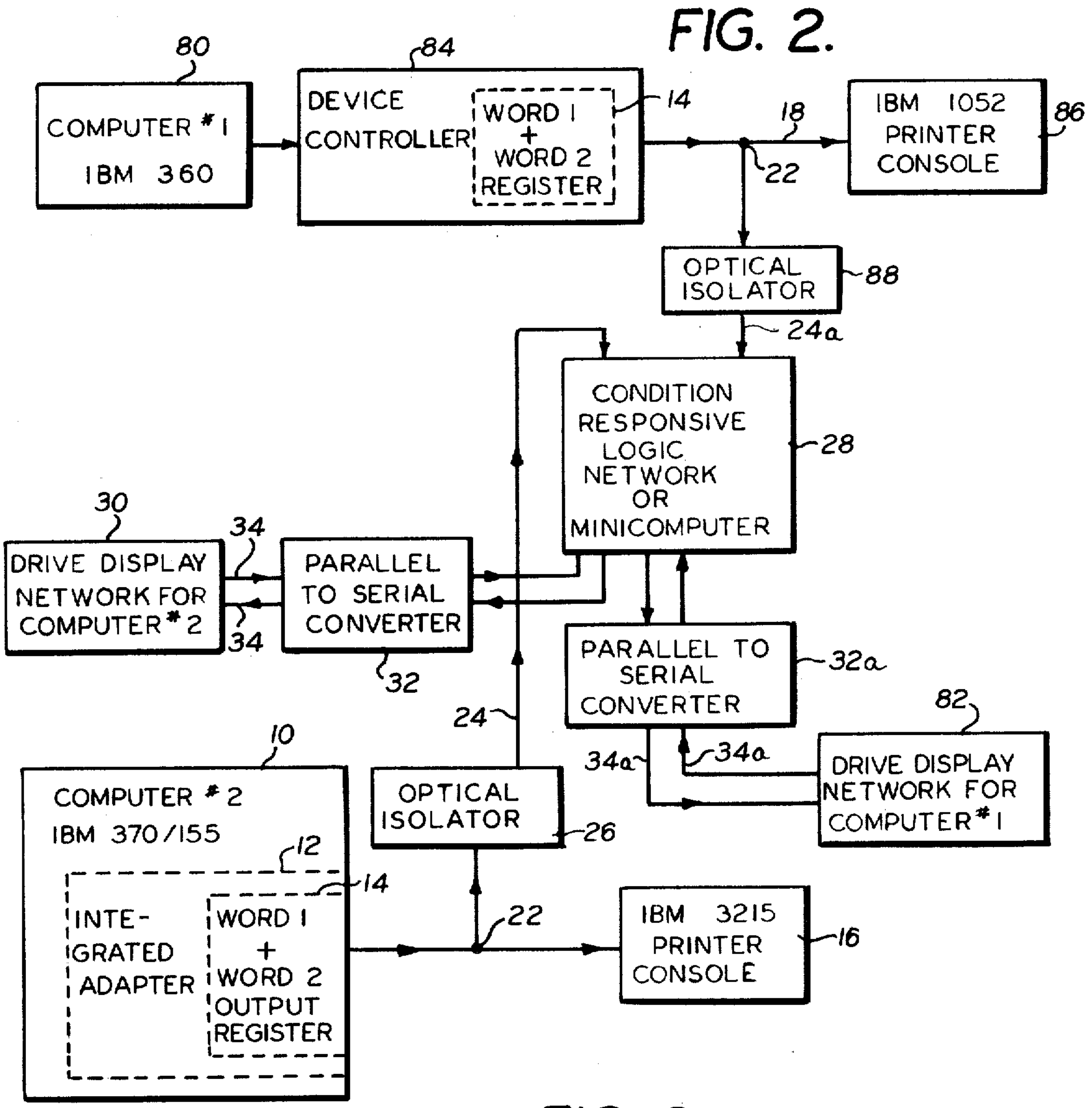
FIG. 2 is a block diagram similar to FIG. 1 of a typical two computer installation employing the preferred display device control system.

FIG. 2 is a block diagram of another typical computer system which is a multicomputer system under control of OS and, by way of example, includes an IBM 360 series computer 80 as well as the previously mentioned IBM 370 Model 155 computer 10 shown by way of example in FIG. 1. The balance of the circuitry associated with the computer system illustrated in FIG. 2, is preferably identical with that previously described with reference to FIG. 1, with the condition responsive logic network 28 being shared by both computer 80 and computer 10 to control the drive display devices 30 associated with the tape drives of computer 10 as well as the drive display devices, generally referred to by the reference numeral 82, associated with the tape drives of computer 80. The drive display device network 82 associated with computer 80 is preferably identical in structure and operation with that previously described with reference to the display device network 30 associated with computer 10 and will not be described in greater detail hereinafter. Suffice it to say that one drive display device is preferably associated with each tape drive utilized with computer 80. Computer 80, which is preferably an IBM 360 series computer, by way of example, utilizes a conventional IBM device controller 84 in place of the integrated adapter 12 utilized with the IBM 370 series computers, which device controller accomplishes the same function as the integrated adapter of providing an interface between the main frame computer 80 and the operator console 86, in this instance an IBM 1052 printer console, by way of example, and translating the OS message control signals from EBCDIC into the appropriate eight byte binary matrix printing code via output register 14. This OS printing message control signal is intercepted preferably by a T-connector 22*a*, which is preferably functionally identical to connector 22, and provided to a conventional optical isolator 88 which is preferably identical with the optical isolator 26 previously described with reference to the embodiment of FIG. 1. Thus, the OS printing message control signal is provided both to the printer console 86 and to the condition responsive logic network 28 via the T-connector 22*a* and the optical isolator 88 which isolates the logic network 28 and the balance of the data input device drive display control system 20 from the computer 80. As was previously mentioned with reference to FIG. 1, the output signals provided from the condition responsive logic network 28 are preferably parallel bit display control signals which are converted to serial bit display signals by conventional parallel-to-serial bit converters 32*a* associated with drive display network 82 and 32 associated with drive display network 30. The operation of this multicomputer system with respect to display device control is preferably identical with that previously described with reference to the single computer system of FIG. 1, with the exception that OS controls the operation of both computers 10 and 80 and the routing of the various OS printing message control signals with the particular associated operator consoles 86 and 16, which message contron signals are intercepted to actuate the appropriate display devices of the appropriate drive display network 30 or 82.

Referring now to FIG. 3, a typical display panel go format for the display indicia associated with the typical drive display device 30*a* is illustrated. As can be seen by reference to FIG. 3, the light emitting diode display comprises a plurality of conventional seven segment displays, which segments are illuminable in proper sequence to provide a digital display of the appropriate number responsive to the decoded digital display control signal, the segments for a typical light emitting diode digital display being designated 50*a*, 50*b*, 50*c*, 50*d*, 50*e*, 50*f* and 50*g*. Of course, the format of the display panel 90 of a typical display device 30*a* may be altered to any desired arrangement, the arrangement illustrated being merely one of the presently preferred arrangements, shown by way of example.

Preferably, the data input device drive display network 20 intercepts or senses the OS printing message control signal at substantially the same time it is being transmitted to the operator console 16 or 86. Accordingly, the appropriate drive display device 30 lights up to display the volume serial number and the proper illuminated indicator lamp or lamps at substantially the same time as the printing message control signal is converted and printed or displayed at the console 16 or 86. Preferably, the appropriate indicator lamps 62 through 74, inclusive, and the appropriate digital display provided by light emitting diodes 46 through 56, inclusive, remain displayed on the appropriate display device 30 until the proper action has been taken by the operator and the display turned off by appropriate closure of the reset switch 76 which, as was previously mentioned, results in the clearing of the shift register 40. Preferably, the indicator lamps 62 through 74, inclusive, have conventional flashers associated therewith so as to provide a flashing indicator signal. The reset switch 76 would normally be activated to turn off the flashing indicators and the volume serial number display after the performance of a dismount operation. Preferably, as was previously mentioned, the circuit is arranged so that on the initial closure of the reset switch 76 only the indicator lamps 62, through 74, inclusive, which are illuminated are turned off. The light emitting diode digital display 46, through 56, inclusive is preferably not turned off until the reset switch is closed or actuated a second time.

Preferably, when a display control message signal contains an INTERVENTION REQUIRED instruction in the instruction field of the shift register 40, the decode matrix and gating network 58–60 simultaneously illuminate lamps 52,64 and 66 to provide a distinct flash alarm type signal. If desired, a separate lamp indicator could be provided to illuminate the message INTERVENTION REQUIRED in place of the activation of these lamps or some other unique combination of lamps could be illuminated, or activation of the retransmit switch 78 will cause the retransmission of the latest data control signal message stored in the storage register of the condition responsive logic network 28.

It should be noted that OS monitors the tape drives so that if the operator improperly executes the instruction visually displayed on the appropriate drive display device 30, the OS internal label-checking and the message signal sequence for tape mounting errors will still be enforced to produce the appropriate OS generated printing message control signals and resultant display control signal or signals to instruct the operator to correct the tape mounting error. These correction instructions will be displayed in proper sequence, as they are executed, on the appropriate drive display device 30, subsequent instructions being buffered and loaded into the storage register of logic network 28 as the previous instruction is executed and cleared.

As was previously mentioned, all messages to the operator console 16 or 86 are buffered by the drive display control system 20 in the storage register of the condition responsive logic network 28. Thus, if a message control signal is already being displayed by the drive display device 30 at the appropriate tape drive, all subsequent messages or display control signals for this particular tape drive are buffered and transmitted sequentially only after the previous message has been satisfied and the reset switch 76 has been activated, the display control signals being buffered in the proper sequence in conventional fashion. As was previously mentioned, in an instance when an INTERVENTION REQUIRED message control signal is received in the instruction field of shift register 40, lamp 62, 64 and 66 are all preferably activated simultaneously so as to flash simultaneously. In such an instance, these indicator lamps are preferably turned off by subsequent closure of the reset switch 76 which results in a clear signal being transmitted from logic network 28 to register 40. Subsequent closure of the retransmit switch 78 preferably provides a display of the latest valid message stored in the condition responsive logic network 28 storage register, which is the message immediately preceding the intervention required message control signal.

It should be noted that the display device control system 20 preferably utilizes the OS message printing codes and the text of the printing message signal so that it is unaffected by the particular version of OS being utilized, such as MFT, MBT or HASP, each OS printing message signal being operated on in the manner previously described to provide the display control signal for the appropriate drive display device 30. It should also be noted, that preferably the shift register or device address of the display device 30 is preferably the same physical device address utilized by the appropriate IBM 370 or 360 series computer 10 and 80, respectively, and is a threecharacter hexadecimal address, If it is desired, however, any other addressing code or scheme could be utilized. In the instance where a multiple computer system, such as illustrated in FIG. 2, utilizes shared or switched tape drives, the display control system 20 intercepts the OS printing message control signal, reformats it and sends it to the appropriate drive, no matter which computer 10 or 80 a particular tape drive is attached to at the time of the occurrence of the printing message control signal pertaining thereto, since the same physical address as the tape drive is preferably utilized by the condition responsive logic network 28 as the shift register 40 address of the drive display device 30. In addition, if desired, the shift register 40 for a particular tape drive display device 30 may have at least two different addresses in the instance of multi channel operation and the display device control system will still function in the manner previously described with respect to whichever channel is being utilized, the register 40 being address for a different channel. Although only two computers 10 and 86 are illustrated in FIG. 2 for a multicomputer operation, the display device control system 20 of the present invention can be utilized with more than two computers operated under OS, simultaneously, such as in a three computer system by way of example.

Summarizing the operation of the display device control system 20 of the present invention, the OS printing message control signal being transmitted to the operator console 16 or 86 is intercepted in a parallel branch path and routed to the optical oscillator 26 or 28, which is a solid state device consisting of a light source at one end and a light detector at the other end with the light source preferably being connected to the computer and the detector preferably being connected to the condition responsive logic network 28, a data bit provided from the computer causing the light source to emit light indicating the presence of a data bit, which is sensed by the light Detector to generate an electrical pulse to the condition responsive logic network 28 indicating the presence of a data bit. The condition responsive logic network, which may be a minicomputer, translates the intercepted binary matrix code printing message control signal into EBCDIC, recognizes the discrete IBM OS message Descriptor code which uniquely identifies the type of message, classifies this message into an indicator lamp instruction code signal such as mount, dismount, intervention required, or scratch, and buffers this Descriptor code message signal in a storage register for subsequent recall. The condition responsive logic network also adds to this signal the instruction field message signal as well as the tape address signal and the volume serial number signal and buffers these message signal portions in the storage register to provide a parallel bit display control message signal therefrom. This display control signal is provided to a parallel-to-serial converter which converts it into a serial bit display control message signal which is routed via a common bus to the appropriate drive display device 30. At the appropriate drive display device 30, this display control signal is reconverted into a parallel bit binary signal which is locally stored in a shift register and decoded to drive an alphanumeric digital display and appropriate indicator lamps to provide an illuminated visual display of the operator control instructions for the designated tape drive to which the instruction pertains. In this manner, the operator need merely watch the visual drive display device to receive his instructions at the appropriate tape drive, as opposed to having to take all instructions from a centrally located operator console 16 or 86 in a hard-copy printed instruction, although such printed instruction is also preferably provided.

It is to be understood that the above described embodiment of the present invention is merely illustrative of the principles thereof and that numerous modifications and embodiments of the invention may be derived within the spirit and scope thereof, such as utilizing the display control system of the present invention in conjunction with disc drives and/or tape drives or in conjunction with data output devices such as printers to tell the operator, by way of example, what form number to be placed on the printer, the number of parts and the carriage control tape number for the printer in a computer installation where multiple printers and multiple forms are utilized. As disclosed in the art, tape drives are noramlly input/output devices, and the term input/output device as used herein is readily interchangeable with the term data input device.

What is claimed is:

1. In a computer system having a plurality of data input devices for providing retreivable data to a computer means for processing thereof in response to an OS generated control signal from said computer means, each of said data input devices comprising a data storage medium, said data being retreivably stored on said data storage medium, and means for converting said stored data into an input signal for said computer representative of said stored data in response to said OS generated control signal, said data storage medium being removably mountable on said converter means, an operable console means operatively connected to said computer means for displaying a hard-copy control message representative of mounting information for said data storage media on said plurality of converter means in response to an OS generated console hard-copy printing message control signal, said printing message control signal having a predetermined format; the improvement comprising a plurality of illuminable display devices, one display device being associated with each data input device at said data input device for providing an illuminable optical display of predetermined portions of said mounting information signal pertaining to said associated data input device, means operatively connected in parallel between said computer means and said console means for intercepting said OS generated console hard-copy printing message control signal, condition responsive logic means operatively connected between said interception means and said display devices for providing a plurality of display device control signals to said display devices in response to said intercepted console control signal, said display device control signals being different in format from said intercepted console control signal, each of said display devices having a plurality of illuminable indicator lamps having associated indicia representative of an operator mounting instruction command pertaining to a particular data storage medium removably mountable on said associated converter means and an illuminable digital display representative of a volume serial number identifier associated with said removably mountable data storage medium, each of said display devices providing a distinct unique illuminable digital display and illuminable indicator lamp display at said associated data input device in response to said display control signals substantially simultaneously with the display of said hard-copy console control message at said operator console means, whereby both a hard-copy display at the operator console means and an interpreted illuminable display at said associated data input device of an OS generated mounting instruction message signal for said data input device is obtainable.

2. A data input device display control system in accordance with claim 1 wherein said intercepted OS generated mounting instruction message signal comprises a digital message comprising a plurality of bits, said message signal having a plurality of field portions comprising a Descriptor code field signal portion, an instruction code field signal portion, a unit address code field signal portion and a Volume Serial Number field signal portion, said OS Descriptor code signal being uniquely representative of a type of said OS generated console control signal, said instruction code signal being representative of a particular data storage medium mounting instruction, said unit address code being uniquely representative of a particular data input device and associated display device of said plurality of data input devices, and said Volume Serial Number signal being uniquely representative of a particular data storage medium; said condition responsive logic means comprising means for converting said intercepted Descriptor Code signal portion and said instruction code signal portion into a lamp indicator control signal comprising a plurality of bits, means for converting said unit address signal portion into a plural byte address signal, means for converting said Volume Serial Number code signal portion into a plural bit digital display control signal, and means for combining said converted signals into said display control signal; said control system further comprising means for transmitting said display control signal to the appropriate display device which corresponds to said unique unit address.

3. A data input device display control system in accordance with claim 2 wherein said condition responsive logic means further comprises buffering means for storing said transmitted display control signal.

4. A data input device display control system in accordance with claim 2 wherein said transmitted display control signal is a serial bit signal and said appropriate display device comprises means for converting said serial bit signal into a parallel bit signal.

5. A data input device display control system in accordance with claim 2 wherein said appropriate associated display device comprises shift register means for receiving and storing said transmitted display control signal, said shift register means having a unique address corresponding to said unique unit address, and decoding means for decoding said display control signal indicator lamp control signal and digital display control signal portions and illuminating said illuminable indicator lamp display and illuminable digital display in response thereto.

6. A data input device display control system in accordance with claim 5 wherein said digital display comprises a plurality of light emitting diode means, each having a plural segment display portion, said decoded digital display control signal comprising distinct plural bit control signals for each of said diode means to provide a multiple position illuminated digital display of said Volume Serial Number.

7. A data input device display control system in accordance with claim 5 wherein said indicator lamp display comprises a plurality of illuminable indicator lamps and means responsive to said decoding means for providing an intermittent control signal to the illuminable lamps corresponding to said illuminable mounting instruction in response to said decoded indicator lamp display control signal, whereby a flashing indicator lamp display is provided.

8. A data input device display control system in accordance with claim 5 wherein said decoding means comprises a decode matrix means and an associated gating means responsive to said indicator lamp and digital display control signals for controlling the illumination of said indicator lamp and digital displays.

9. A data input device display control system in accordance with claim 5 wherein said display device further comprises plural state switch means for providing a reset control signal to said condition responsive logic means, said condition responsive logic means further comprising means for providing a clear signal to said display device shift register means for initializing said shift register means in response to said reset control signal.

10. A data input device display control system in accordance with claim 5 wherein said condition responsive logic means further comprises buffering means for storing said transmitted display control signal, said display device further comprises plural state switch means for providing a retransmit control signal to said condition responsive logic means, and said condition responsive logic means still further comprises means for providing said buffered display control signal to said display device shift register means in response to said retransmit control signal.

11. A data input device display control system in accordance with claim 1 wherein said intercepter means comprises optical isolation means between said condition responsive logic means and said computer means for optically isolating said computer means from said condition responsive logic means in a one way transmission path to said condition responsive logic means.

12. A data input device display control system in accordance with claim 1 wherein said computer system comprises a plurality of computer means with which said plurality of data input devices are associated, each of said computer means having an associated operator console means, each of said computer means being operatively connected in parallel between its associated console means and said condition responsive logic means for intercepting the OS generated console hard-copy printing message control signal associated with the associated console means.

13. A data input device display control system in accordance with claim 1 wherein said computer means is a general purpose digital computer and said console means is a printer console, said hard-copy console control message being a binary matrix printing code.

14. A data input device display control system in accordance with claim 1 wherein said computer means includes a device controller means for said console means for providing said hard-copy console control signals to said console means, said intercepter means being operatively connected in parallel to said device controller means.

15. A data input device display control system in accordance with claim 14 wherein said device controller means comprises a WORD 1 + WORD 2 output register means for translating said OS computer generated console hard-copy printing message control signal into an OS matrix printing coded console control signal, said intercepter means being operatively connected in parallel to said output register means.

16. A data input device display control system in accordance with claim 1 wherein said condition responsive logic means comprises a minicomputer means.

17. A data input device display control system in accordance with claim 7 wherein said plurality of indicator lamps comprise a mount instruction indicator signal lamp, a scratch instruction indicator signal lamp, a dismount instruction indicator signal lamp, a dismount-keep instruction indicator signal lamp, a dismount-retain instruction indicator signal lamp, and a no-label-scratch instruction indicator signal lamp, said lamps being selectively illuminable in response to said intermittent control signal.

18. A data input device display control system in accordance with claim 1 wherein said data input device converting means comprises a tape drive means and said data storage medium comprises storage tape.

19. A data input device display control system in accordance with claim 1 wherein said computer means is a general purpose digital computer means selected from the group consisting of IBM 370 and 360 series computers.

* * * * *